(12) United States Patent
Coan et al.

(10) Patent No.: US 6,728,520 B2
(45) Date of Patent: Apr. 27, 2004

(54) SYSTEM AND METHOD FOR CONSTANT LOOP GAIN IN A CLOSED LOOP CIRCUIT

(75) Inventors: Phil Coan, San Diego, CA (US); Seng-Woon Chen, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 09/387,137

(22) Filed: Aug. 31, 1999

(65) Prior Publication Data

US 2003/0040342 A1 Feb. 27, 2003

(51) Int. Cl.[7] .............................................. H04Q 11/12
(52) U.S. Cl. ................. 455/126; 455/115.3; 455/127.2; 455/522; 455/345
(58) Field of Search ....................... 455/126, 127.1, 455/127.2, 67.11, 69, 226.1, 226.2, 12.1, 13.4, 91, 95–100, 107, 115.1, 115.3, 129, 522, 572, 574, 575.1, 345; 370/311, 316, 320, 342, 441; 330/129, 137, 289

(56) References Cited

U.S. PATENT DOCUMENTS

| 4,901,307 | A | | 2/1990 | Gilhousen et al. | |
|---|---|---|---|---|---|
| 5,033,109 | A | * | 7/1991 | Kawano et al. | 455/127 |
| 5,109,541 | A | * | 4/1992 | Park | 455/127 |
| 5,267,262 | A | | 11/1993 | Wheatley, III | |
| 5,383,219 | A | | 1/1995 | Wheatley, III et al. | |
| 5,396,516 | A | | 3/1995 | Padovani et al. | |
| 5,574,993 | A | * | 11/1996 | Kobayashi et al. | 455/126 |
| 5,603,096 | A | * | 2/1997 | Gilhousen et al. | 455/69 |
| 5,691,974 | A | | 11/1997 | Zehavi et al. | |
| 5,724,645 | A | * | 3/1998 | Na | 455/67.1 |
| 5,809,420 | A | * | 9/1998 | Ichiyanagi et al. | 455/12.1 |
| 6,230,031 | B1 | * | 5/2001 | Barber | 455/127 |
| 6,256,483 | B1 | * | 7/2001 | Moerder et al. | 455/115 |

* cited by examiner

Primary Examiner—Quochien B. Vuong
(74) Attorney, Agent, or Firm—Philip R. Wadsworth; Gregory D. Ogrod; Jae-Hee Choi

(57) ABSTRACT

A system and method for controlling transmitted output power of outdoor antenna units coupled to hand held wireless devices. When the antenna unit is operating with wireless network technology it may also be referred to as an outdoor unit. Transmit power level of an information signal is controlled in the outdoor unit by obtaining a control voltage from the hand held unit. The control voltage is used by the outdoor unit, to adjust the power level of the transmitted information signal. The transmit power level is adjusted by the outdoor unit performing the following steps: (1) detecting the transmit power level of the antenna unit, (2) determining whether the transmit power level is equal to a control voltage, and (3) adjusting the transmit power level based on the control voltage if the transmit power level is not equal to the control voltage. The adjustment of the transmit power level is accomplished by a closed loop circuit that maintains a constant loop gain.

8 Claims, 6 Drawing Sheets

SYSTEM AND METHOD FOR CONSTANT LOOP GAIN IN A CLOSED LOOP CIRCUIT

CROSS-REFERENCE TO RELATED APPLICATIONS

This application is related to commonly-owned applications, filed concurrently herewith, entitled "Power Output Control Of A Car Kit By A Coupled Wireless Device" having application Ser. No. 09/387,143; "System And Method For Temperature Compensation Of Wireless Antenna Units" having application Ser. No. 09/387,138; and "System And Method For Power Measurement In Outdoor Antenna Units" having application Ser. No. 09/387,139, which are incorporated herein by reference.

BACKGROUND OF THE INVENTION

I. Field of the Invention

The present invention relates generally to mobile telephone systems, and more particularly to a system and method for control of the output power for an outdoor unit coupled to a wireless device transferring an information signal, through the use of a closed loop circuit. The present invention is most applicable to wireless communications devices used in communication systems using code division multiple access (CDMA) modulation techniques, where output power control is critical.

II. Related Art

Mobile telephone systems allow customers to establish communication links or place telephone calls from wireless devices such as portable or hand held mobile phones. Calls initiated or received by wireless devices used in such systems are processed by a wireless network. One type of wireless network is a terrestrial cellular communication system communicating via a series of base stations and ground-based antennas that operate in the 800–1900 MHz range. Cellular communication systems limit the user to communication within a cell, which comprises a geographical service area to which the base station antennas can transmit. Users can move from cell to cell through known hand-off procedures that transfer calls from one cell to another. However, if no base station is within range of the mobile transmitter, such as in a rural area, a user cannot use the mobile telephone service.

Developments in mobile telephone system technology have led to wireless communication systems or networks that can transfer signals using a Low Earth Orbit (LEO) satellite system. The satellite systems can transmit and receive signals in rural areas as well as cities through the beams they project, and a user does not need to be within close range of a ground-based antenna. As a result, satellite communication systems are not limited to major cities as are cellular networks. In addition, each LEO satellite is capable of carrying a large number of user transmissions simultaneously. Various satellite access schemes such as time division multiple access (TDMA) and code division multiple access (CDMA) allow concurrent access to LEO satellites by a large number of users.

The number of users that can be serviced by a wireless communication system, the system capacity, increases if the power output from each user's wireless device is decreased to the minimum power needed for quality transmission, and overhead or non-traffic messages or channel activity is reduced. This is the result of decreasing mutual interference between users, which is especially important in limited power environments such as CDMA type communication systems. However, if the power of a user's signal becomes too low, the quality of service for that user becomes unacceptable. So, there is a desire to maintain as high a power level as possible to have higher quality service.

Thus, the number of users that may be provided service is increased by maintaining overhead power levels and each individual user's signals at the minimum levels needed for optimum performance. Therefore, the power output of wireless device transmissions are generally controlled using one or more power control methods to minimize interference and maximize communication link quality. Techniques for power control are discussed for example in U.S. Pat. No. 5,383,219, entitled "Fast Forward Link Power Control In A Code Division Multiple Access System," issued Jan. 17, 1995; U.S. Pat. No. 5,396,516, entitled "Method And System For The Dynamic Modification Of Control Parameters In A Transmitter Power Control System," issued Mar. 7, 1995; and U.S. Pat. No. 5,267,262, entitled "Transmitter Power Control System," issued Nov. 30, 1993, which are incorporated herein by reference. In addition, also see U.S. patent application Ser. No. 09/164,384 filed Sep. 30, 1998 entitled "System And Method For Optimized Power Control"; and Ser. No. 08/908,528, filed Aug. 7, 1997, entitled "Method And Apparatus For Adaptive Closed Loop Power Using Open Loop Measurements," which are incorporated herein by reference. The result is the communication system efficiently carries the substantially maximum number of individual user transmissions simultaneously.

Wireless devices, also referred to as user terminals, in current wireless communications systems may be any of several different types. One type is the portable unit, which is a hand held device carried by the user and requires no external power source or antenna system. Another type is the mobile unit or station, which is typically fixed in a vehicle and operates like a desk type phone. A mobile unit has a separate unit (or "box") that is mounted in the vehicle and contains most of the transmitting and receiving circuits or hardware. A hand held unit such as a phone handset, containing a keypad, speaker and microphone, is connected by one or more cables, conductors, or connectors to the box. A cradle is provided for supporting the handset unit when it is not in operation or is being used in a "hands free" mode. The box in turn is connected by a cable to an externally mounted "outdoor" antenna unit, which transmits and receives signals via a satellite or terrestrial cellular communications system or a base station or gateway.

A third type of user terminal combines the features of both a portable unit and a mobile unit. This type uses a hand held device that can be used as a standalone unit away from the vehicle, and can be connected to a vehicle mounted assembly sometimes called a "car kit," for use in the vehicle. The car kit uses an external or outdoor unit (ODU) with an outdoor antenna to accommodate communications for the wireless device. A primary advantage of this combination unit or arrangement is that when the wireless device is used in the vehicle it can utilize additional power provided by the vehicle mounted electronics to establish a better and stronger communications link with satellite transceivers. It also allows conservation of internal battery power, drawing on vehicle provided power instead.

Satellite telephone systems are particularly sensitive to outdoor or external antenna unit matching at the mobile unit due to potential path losses and a resulting difficulty in power control. For optimum performance, the power output of the outdoor unit must be calibrated against, or configured with, specific phone transmission circuits in mind. At present, a given car-kit is designed in the factory to function with certain characteristics for phones with which it is to be connected. Once this designing or matching takes place, the autonomous nature of phones and car kits is diminished because the phone is limited to being used with certain car kits or outdoor antenna units, such as specific models or manufacturers, having closely matched characteristics.

This clearly sets certain constraints for mobile units or hand held phones used with car kits in order to provide a closer match between the power output desired by the phone power control systems or methods, and the power actually being delivered by the outdoor unit. Yet, in the actual marketplace it is not uncommon that a user may have more than one portable phone or have one that can be used both as a standalone unit and as a mobile phone when placed in a cradle mounted in a vehicle. Also, a user may commonly upgrade his or her phone as new models come on the market. Therefore, the mobile unit employed with a car kit may change permanently or on a transient basis, creating potential undesirable power matching problems.

One goal of the present invention is to allow a variety of hand held wireless devices to be used with a given vehicle mounted outdoor antenna unit or car-kit, while maintaining a desired level of accuracy for the power output by the outdoor unit. Here, a given outdoor antenna unit is not calibrated against specific hand held device characteristics, but allowed to adjust in response to changing characteristics or power requirements for a device to which it is coupled. For improved or optimum performance, the outdoor antenna unit and the hand held wireless device connected to it need to communicate transmit power levels and requirements.

What is needed is a system and method for the hand held device to inform the outdoor unit of the transmit power level to produce or use in transferring signals, using a control voltage or signal. Further, what is needed is a system and method for allowing the outdoor unit to adjust its transmit power level based on the control voltage.

SUMMARY OF THE INVENTION

The present invention is a system and method for controlling transmit power level of an information signal transmitted by an outdoor antenna unit which is used with a cradle or receptacle for coupling to a hand held, or holdable (portable), wireless communication device originating the information signal being controlled. With the present invention, transmit power level is controlled by transmitting a control voltage from a hand held device to the outdoor antenna unit (also referred to as an outdoor unit, or ODU) and then allowing the outdoor unit to adjust its transmit power level via a closed loop circuit. Because the hand held device informs the outdoor unit of the transmit power level to produce, the present invention allows a variety of hand held wireless devices to work with many different outdoor units while maintaining appropriate power output levels.

The system of the present invention includes a logic unit in the hand held device for determining an appropriate transmit power for transmission of the information signal and for producing a control voltage, a closed loop circuit in the outdoor unit for receiving the control voltage from the logic unit and for adjusting the transmit power level of the information signal based on the control voltage using a substantially constant loop gain. The logic unit determines the control voltage based on the data rate for the signal being transmitted.

The closed loop circuit of the present invention includes a power detector for detecting the transmit power level of the outdoor unit, a log amplifier that converts the output of the power detector to a digital format, a control voltage amplifier that determines whether the log amplifier output is equal to the control voltage and then, if necessary, converts the log amplifier output to a voltage format, a gain control amplifier that adjusts the output of the control voltage amplifier and converts it to a digital format, a filter that filters the output of the gain control amplifier, and a power amplifier that converts the output of the filter to a voltage format to produce the new input for the power detector. The present invention also provides for a ROM look-up table that replaces the log amplifier. The closed loop circuit of the present invention maintains a substantially constant loop gain.

The method of the present invention includes detecting the transmit power level of the outdoor unit, determining whether the transmit power level is equal to the control voltage, and adjusting the transmit power level based on the control voltage if the transmit power level is not equal to the control voltage.

BRIEF DESCRIPTION OF THE DRAWINGS

The features, objects and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

With the system and method of the present invention, a hand held wireless device informs an external or outdoor antenna unit of the transmit power level to produce. This information is passed from the hand held device to the antenna unit by a constant output of control voltage. Based on the current control voltage level, the outdoor antenna unit adjusts its transmit power level used for transfer of an information signal through the use of a closed loop circuit.

One embodiment of the present invention is in a car kit that comprises an external antenna unit, also referred to as an outdoor unit or ODU, that mounts to the exterior of a vehicle, such as the trunk or roof of a car or truck and a cradle. A hand held device interfaces with the car kit to make and receive calls or establish communication links. The car kit operates in a wireless satellite communications system, preferably one that uses Low Earth Orbit (LEO) satellites. However, it would be apparent to one skilled in the relevant arts that other satellite systems, such as ones using Medium Earth Orbit (MEO) satellites, or geosynchronous (GEO) satellites, could also be used with this invention. The invention may also prove useful in some terrestrial communication systems where car kit power losses or differences unacceptably effect the control of output power.

Figure 1:
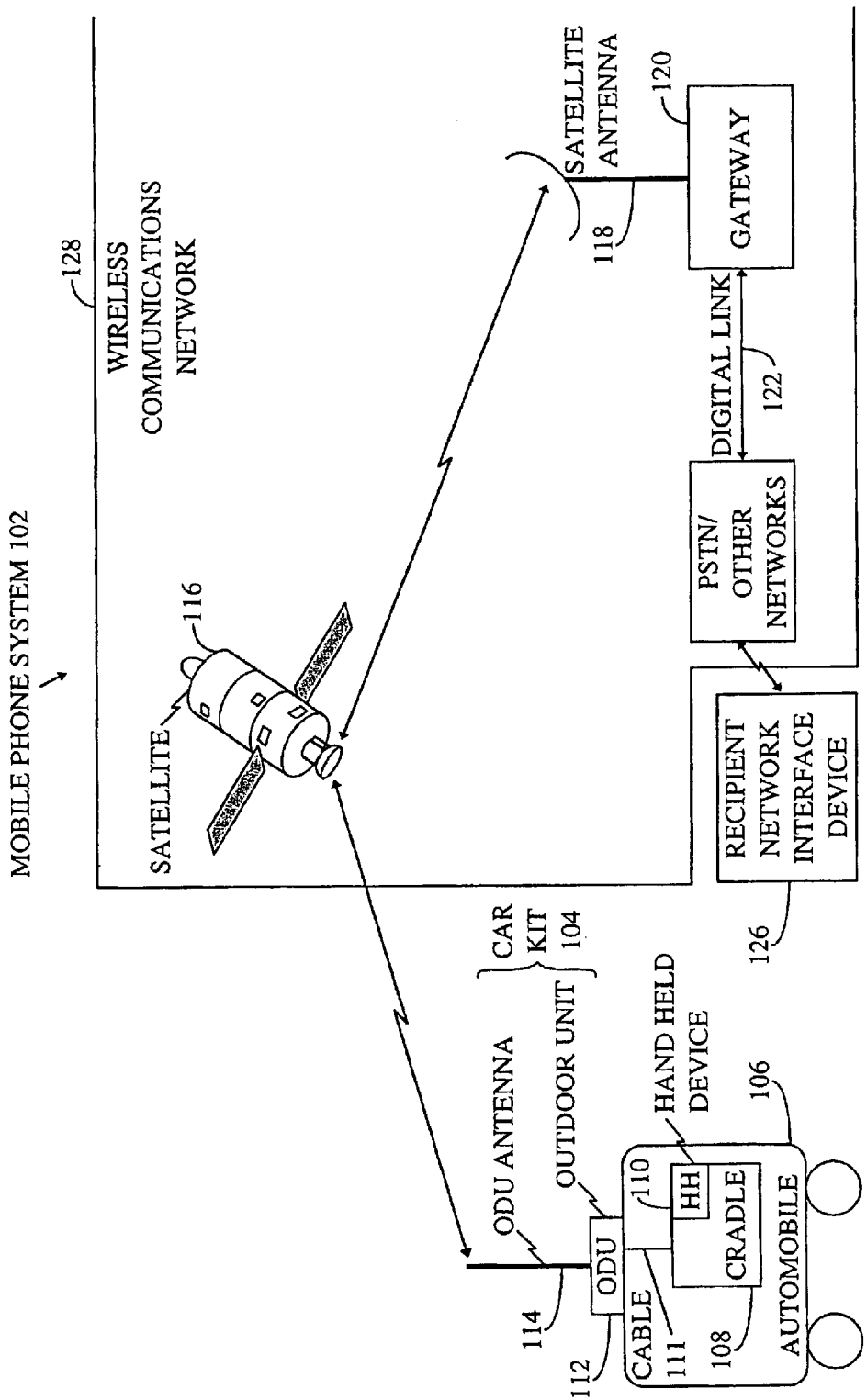
FIG. 1 is a block diagram of a mobile phone system according to a preferred embodiment of the present invention.

FIG. 1 is a block diagram of an exemplary wireless mobile phone system 102, in which the present invention may be used. Such communication systems are discussed in U.S. Pat. No. 4,901,307, issued Feb. 13, 1990, entitled "Spread Spectrum Multiple Access Communication System Using Satellite or Terrestrial Repeaters;" U.S. Pat. No. 5,691,974, which issued Nov. 25, 1997, entitled "Method and Apparatus for Using Full Spectrum Transmitted Power in a Spread Spectrum Communication System for Tracking Individual Recipient Phase Time and Energy;" and U.S. patent application Ser. No. 09/120,859 filed Jul. 21, 1998, entitled "System And Method For Reducing Call Dropping Rates In A Multi-Beam Communication System," all of which are assigned to the assignee of the present invention, and are incorporated herein by reference.

Mobile phone system 102 comprises one or more hand held wireless devices 110 communicating with a wireless communications system or network 128 comprising equipment related to wireless communication service. Wireless device 110 is mounted in or coupled to a car kit 104. Car kit 104 is mounted in a vehicle, such as an automobile or truck, 106, although other locations are possible. Car kit 104 includes a cradle 108, a cable 111, an outdoor unit (ODU) 112, and an ODU antenna 114. Hand held device 110 can rest in or be removed from cradle 108. It is anticipated and will be readily understood by those skilled in the art, that the "car kit" and ODU represent elements that can be used in non-vehicular arrangements as well, such as for fixed remote communication applications in or around structures where unit mobility is occasionally exploited or increased power is sometimes desired.

Hand held device 110 has two modes of operation, as a standalone unit and as a hand set plugged into cradle 108. When hand held device 110 operates as a standalone unit, it transmits and receives via satellite 116 using an antenna (not shown) built into or manufactured as part of the hand held device. When hand held device 110 is used within vehicle 106 and is connected to cradle 108, it transmits and receives via ODU 112.

Connection of the elements of car kit 104 will next be illustrated. Cradle 108 is connected to ODU 112 by cable 111. ODU 112 mounts to an exterior surface of vehicle 106. Antenna 114 is attached to the top of ODU 112. Hand held device 110 may rest within cradle 108, whereby it is electrically connected to ODU 112 through cradle 108 directly, by inductive coupling, or via a wire connection in a well known manner. When a wire connection is used, hand held device 110 may be removed from its resting position within cradle 108 by a user to initiate or receive a call and still remain electrically connected to car kit 104. In addition, hand held device 110 may be unplugged from cradle 108 and taken outside vehicle 106, or other structure, for stand-alone use. In that event, hand held device 110 is electrically disconnected from car kit 104 and does not utilize any features that are incorporated in car kit 104.

Cradle 108 remains within vehicle 106 and ODU 112 remains fixed to vehicle 106. Mobile phone system 102 transmits to and receives signals from an antenna 118 connected to a ground base station, hub, or gateway 120 via satellite 116 providing service for an area wireless device 110 is located in, in a manner known to persons skilled in the relevant arts, and disclosed in the patents referenced above. A gateway provides communication links for connecting a wireless device, also referred to as a user terminal, to other user terminals or users of other communication systems, such as a public switched telephone network.

Hand held device 110 constantly, or on a pre-selected periodic basis, adjusts the power level of transmitted signals during a call or communication link depending on a number of know factors, one of which is the data rate. Data rate can change depending on the type or amount of data being sent, for example, data transmitted via personal computers, digitized representation of a voice, facsimile data, etc. (connected to or forming part of wireless device 110) may use different rates. In addition, variable rate vocoders are typically used for voice communications creating different rates within a given communication signal. Different data rates require different power for transmission of that data.

In order to allow a variety of hand held devices 110 to work efficiently with a variety of ODUs 112 when hand held device 110 is connected to cradle 108, hand held device 110 sends information to ODU 112 indicating the required transmit power level ODU 112 must produce. This provides the ability to obtain the appropriate power output, as discussed above, to maintain a quality communication link without excessive interference with other wireless devices using the communication system, and allows greater flexibility in pairing hand held devices 110 and ODU 112 independent of the model and vendor.

In some embodiments the initial output power for hand held device 110 is set arbitrarily low, such that no other receiver is expected to receive the signal, this assures that the ODU is not overpowered by the output signal, nor is the emissions level too high. The process of the invention then operates to achieve an important function of setting the output power to a desired (more useful) level as quickly as possible while conforming to any system constraints such as emission levels set by government agencies, or desired interference levels in the communication system. It is generally undesirable to have hand held device 110 or ODU 112 simply start at a very high power level even if that is ultimately what is chosen.

With wireless device 110 in cradle 104, a call can be initiated by entering digits into a keypad specifying a particular destination number, also referred to as a telephone number, and then entering a send command using the keypad. Information is then transmitted to gateway 120 including information used to establish, process, or terminate the call. Alternatively, a call or request for communication can originate with another system user, the communication system itself, or a connected network. During a call, operation of mobile phone system 102 generally includes sending information signals between hand held device 110, gateway 120, and another signal recipient, such as over a connected network through network interface device 126, using the components within the wireless communications network 128 (as described in reference to FIG. 1 above).

The signals being transferred follow one or more standards for communication such as the well known IS-95 standard for wireless communication. The gateway interprets information signals in accordance with such standards and responds to the call, or switches it to other components within the wireless communications system. The destination number received by gateway 120 determines the switching that is needed to complete the call to the intended recipient, by the gateway or another connected network. Finally, the call proceeds until one of the parties terminates the call.

Whether hand held device 110 originates or responds to a call, during the call, hand held device 110 adjusts the transmit power level of the information signals as the data rate changes or as the path loss or signal attenuation changes, in accordance with known power control techniques or algorithms, as discussed above. In addition, hand held device 110 adjusts the transmit power level to compensate for car kit 104 losses. Because the signal must transmit through cable 111 and ODU 112 before transmitting via ODU antenna 114, losses result in a difference between the power of the initial transmit signal and the power output from ODU 112. Hand held device 110 communicates with ODU 112 via a control voltage indicating the transmit power level wireless device 110 desires to have transmitted and, therefore, the ODU 112 needs to generate.

Figure 3:
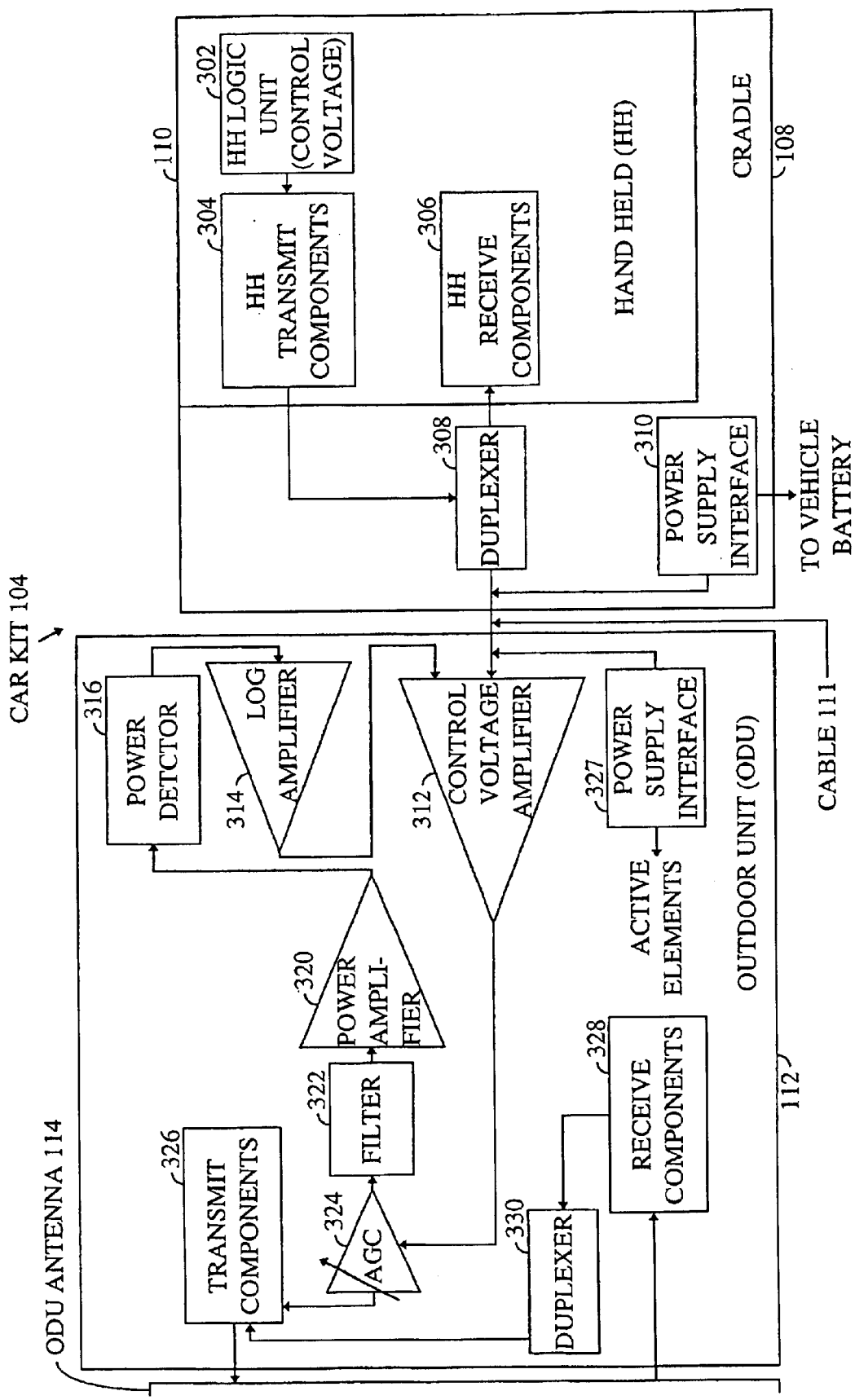
FIG. 3 is a block diagram of a car kit according to a preferred embodiment of the present invention.

FIG. 3 is a block diagram of an exemplary car kit 104. Car kit 104 comprises components used to transmit and receive via satellite 116 in order to communicate with gateway 120. Car kit 104 interfaces with a hand held device 110 connected to cradle 108, which is connected to outdoor unit 112 by cable 111. ODU 112 transfers signals, transmit and receive through ODU antenna 114 connected to ODU 112.

Hand held device 110 comprises receive components 306 and transmit components 304, also referred to as hand held receive and transmit components. In addition, hand held device 110 comprises a logic unit 302 that generates a substantially constant control voltage output to send to ODU 112. Logic unit 302 comprises one or more processors that may have the capability of processing computer software in the form of lines of executable code of a computer programming language residing in storage medium. Processors may actually constitute processing capability dispersed among one or more processing chips, application specific integrated circuits (ASICs), or any other hardware capable of processing computer software. It is well known that control processors form part of hand held wireless devices as discussed in the above-referenced patents. In addition, logic unit 302 includes or uses an associated storage medium. In one embodiment, logic unit 302 is implemented with an Intel 386 microcomputer. The Intel 386 microcomputer is capable of processing many tasks which is necessary for operation of hand held device 110.

Cradle 108 includes a duplexer 308 and a power supply interface 310.

The connection between hand held device 110 and cradle 108 is described next. Logic unit 302 is connected to transmit components 304 in order to send the control voltage to ODU 112. Transmit components 304 are connected to duplexer 308 which provides a connection to cable 111. Duplexer 308 is also connected to receive components 306 so that they can receive signals from satellite 116 via cable 111 and transfer them into hand held device 110. In general, the well known operation of duplexer 308 permits the connection of the transmit components 304 and receive components 306 to a common antenna. Power supply interface 310 within cradle 108 is connected to the link or connection between hand held device 110 and cable 111. In addition, power supply interface 310 is connected to a vehicle battery, generator, or other known power source (not shown) to provide a source of power for hand held device 110. Cable 111 is connected to a control voltage amplifier 312 within ODU 112.

ODU 112 comprises transmit components 326, receive components 328, duplexer 330, and a closed loop circuit. The transmit and receive components are also referred to as ODU transmit and receive components. The closed loop circuit of ODU 112 comprises a power detector 316, a log amplifier 314, control voltage amplifier 312, a gain control amplifier (AGC) 324, a filter 322 and a power amplifier 320. The closed loop circuit maintains a substantially constant loop gain. The components of a closed loop circuit are well known in the art.

Power detector 316 detects the power within ODU 112. In an embodiment of the present invention, power detector 316 is implemented with a full-wave zero bias Schottky diode detector (ZBS) such as model number HSMS2852, manufactured by Hewlett Packard. Power detector 316 design specifications include providing at least 25 db dynamic range, having power estimation errors of ±0.5 db from 27–35 dBm, a power estimation time of 1 millisecond, and operating at temperatures of −20° C. to +60° C. ambient.

The connection between the components of ODU 112 will be described next. Duplexer 330 is connected to transmit components 326 and receive components 328 within ODU 112. The output of transmit components 326 is connected to ODU antenna 114. Similar to duplexer 308 of cradle 108, duplexer 330 permits the connection of the ODU transmit components 326 and ODU receive components 328 to a common antenna.

Figure 2A:
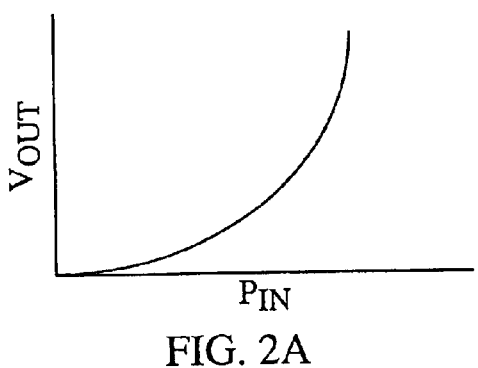
FIGS. 2a, 2b, and 2c are graphs of power versus voltage illustrating the output function for a power detector, a log amplifier, and a resulting combined linear function.
Figure 2B:
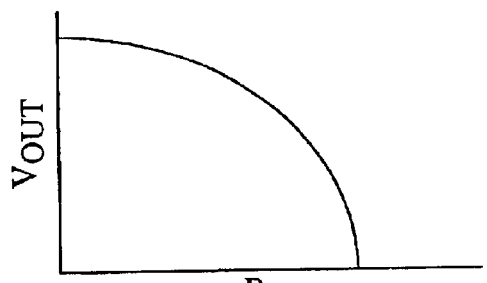

In the closed loop circuit of ODU 112, the output of power detector 316 is connected to log amplifier 314. The output (or voltage) of power detector 316 varies in a logarithmic manner or according to a logarithmic function. The logarithmic function of a power detector output is shown in FIG. 2a which graphically depicts power in ($P_{in}$) versus voltage out ($V_{out}$). However, the function of the output of log amplifier 314 is the inverse of the logarithmic function. The inverse logarithmic function of log amplifier output is shown in FIG. 2b which graphically depicts power in ($P_{in}$) versus voltage out ($V_{out}$).

Figure 2C:
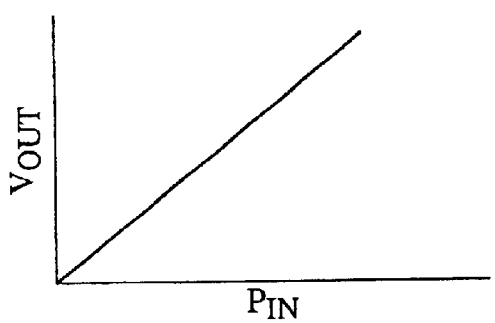

A goal of the present invention is to generate a temperature stable power detector 316 and log amplifier 314. This is accomplished when the output of power detector 316 is supplied to log amplifier 314 and multiplied together. The result is that log amplifier 314 effectively undoes the logarithmic function of power detector 316 and produces a linear function, which indicates a more stable output. The linear function of this multiplication process is shown in FIG. 2c which graphically depicts power in ($P_{in}$) versus voltage out ($V_{out}$).

Log amplifier 314 provides a dBm output level for a voltage input level. The output of log amplifier 314 is connected to control voltage amplifier 312, which provides a voltage level output in response to a dBm input. Control voltage amplifier 312 receives the control voltage from hand held device 110. The output of control voltage amplifier 312 is connected to gain control amplifier 324. Gain control amplifier 324 which provides a dBm output in response to a voltage input. The output of gain control amplifier 324 is connected to filter 322. The output of filter 322 is connected to power amplifier 320, which corresponds to a dBm input and voltage output. Finally, to complete the closed loop circuit, the output of power amplifier 320 is connected to power detector 316.

The closed loop circuit of ODU 112 is used to adjust the power output levels it uses in response to any given input signals based on the control voltage supplied to it by hand held device 110. Since ODU 112 adjusts itself, ODU 112 and hand held device 110 do not have to be calibrated or have closely matched in performance characteristics because the ODU adjusts to meet the characteristics or demands of wireless device 100 and of the interconnections or coupling of the two. Therefore, a variety of hand held wireless devices 110 can be used with a variety of ODUs 112, since hand held device 110 effectively knows the gain (or output power) of ODU 112 due to the closed loop circuit.

The closed loop circuit of ODU 112 is used as a solution to control output power within ODU 112 without feeding the output power back to hand held device 110. Within the closed loop circuit of ODU 112, loop bandwidth changes with the power level (output of power detector 316). The main component in ODU 112 that introduces instability is diode power detector 316. In addition, loop stability changes with the power level because the gain of power detector 316 varies with changes in power level. The use of log amplifier 314 results in the linearization of the variance of the power and the closed loop gain, and the stability of the closed loop circuit within ODU 112 stays substantially constant.

Figure 2D:
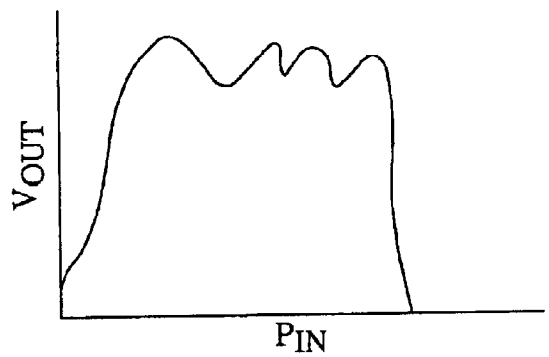
FIGS. 2d and 2e are graphs of power versus voltage illustrating loop stability at lower and higher power levels, respectively.
Figure 2E:
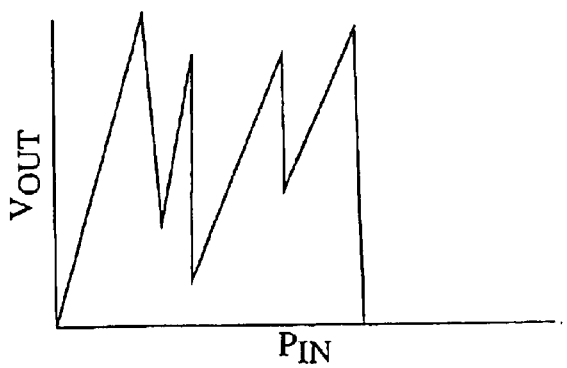

Without log amplifier 314, the loop bandwidth and loop stability change with changes in the power level. This is due to the fact that different power levels have different characteristics and, therefore, have different requirements (or parameters) for loop stability. This is illustrated by the two graphs shown in FIGS. 2d and 2e. The graph of FIG. 2d illustrates that at a lower power level, the system is reasonably stable or damped even without log amplifier 314. But, at a higher power level, the system becomes unstable or under-damped without log amplifier 314. This is illustrated in the graph of FIG. 2e.

Therefore, as the power level changes, what is needed is constant system damping. The goal is to maintain constant loop gain (parameters) in the closed loop circuit of ODU 112 versus the constant change of control voltage supplied to ODU 112 by hand held device 110. A look-up table can be used in place of log amplifier 314. This table can be stored in one of a variety of known memory elements or devices such as a ROM or RAM circuit. For purposes of clarity, the preferred embodiment is discussed herein as using a ROM based look-up table.

A look-up table is a natural choice to use with gain control amplifier 324 because it is inherently temperature stable. The ROM look-up table is very flexible because it can highlight critical power levels with 0.5 dBm power increments where desired (at arbitrary levels). In addition, every detector in the system uses the same ROM look-up table, so no matching is needed. The ROM look-up table is preferably 16K×6 bits, which provides for 11 bits data and 3 bits temperature compensation. However, those skilled in the art will readily understand that additional or fewer bits can be used depending on a desired level of resolution or accuracy and control. Following is an example ROM look-up table.

ROM Look-Up Table

| $P_{out}$ (dBm) | 6-bit word | $V_{det}$ (min) (mV) | $V_{det}$ (max) (mV) | Log ($V_{det}$) (min) | Log ($V_{det}$) (max) |
|---|---|---|---|---|---|
| 37.5 | 111111 | 4216.97 | $V_{ref}$ | 3.625 | 3.653 |
| 37.0 | 111110 | 3758.37 | 4216.97 | 3.575 | 3.625 |
| 36.5 | 111101 | 3349.65 | 3758.37 | 3.525 | 3.575 |
| 36.0 | 111100 | 2985.38 | 3349.65 | 3.475 | 3.525 |
| 35.5 | 111011 | 2660.73 | 2985.38 | 3.425 | 3.475 |
| 35.0 | 111010 | 2371.37 | 2660.73 | 3.375 | 3.425 |
| 34.5 | 111001 | 2113.49 | 2371.37 | 3.325 | 3.375 |
| 34.0 | 111000 | 1883.65 | 2113.49 | 3.275 | 3.325 |
| ... | | | | | |
| 30.5 | 110001 | 841.40 | 944.06 | 2.925 | 2.975 |
| 30.0 | 110000 | 749.89 | 841.40 | 2.875 | 2.925 |
| 29.5 | 101111 | 668.34 | 749.89 | 2.825 | 2.875 |
| ... | | | | | |
| 20.5 | 011101 | 84.14 | 94.41 | 1.925 | 1.975 |
| 20.0 | 011100 | 74.99 | 84.14 | 1.875 | 1.925 |
| 19.0 | 011011 | 66.83 | 74.99 | 1.825 | 1.875 |
| ... | | | | | |
| 11.0 | 010011 | 8.91 | 11.22 | 0.95 | 1.05 |
| 10.0 | 010010 | 7.08 | 8.91 | 0.85 | 0.95 |
| 9.0 | 010001 | 5.62 | 7.08 | 0.75 | 0.85 |
| ... | | | | | |
| 0.0 | 000000 | 0 | 0.025 | NA | |

Where:

$V_{det}$(min/max) levels for Temperature=5°–15° C. and 55°–70° C.

$V_{ref}$=4.500 V. Quant=2.2 mV applied to $V_{det}$ values shown.

1.0 dB steps, P<20 dBm.

All unassigned words are available for other data.

To calibrate power detector 316, apply P=30 dBm and set DC gain for 794.3 mV. Thus, all detectors start within +/−2.2 mV of each other @ 30 dBm & 23° C.

Duplexer 312 in ODU 112 and duplexer 308 in cradle 108 allow connection between multiple circuits. The interfaces may be implemented using known duplexers such as those manufactured by Murata, for example Murata's duplexer model number DSY21R61C2R49BHB. In an alternate embodiment, car kit 104 includes the ability to establish a terrestrial cellular communications link (not shown). In such an embodiment, triplexers are used in place of duplexers 312 and 308 in order to connect three different communication paths or links including satellite transmit, satellite receive, and cellular links. In this alternate embodiment, the circuit arrangement of which would be readily apparent to one skilled in the relevant arts, allows the mobile phone to be used in either a terrestrial cellular system or a satellite communications system.

Figure 4:
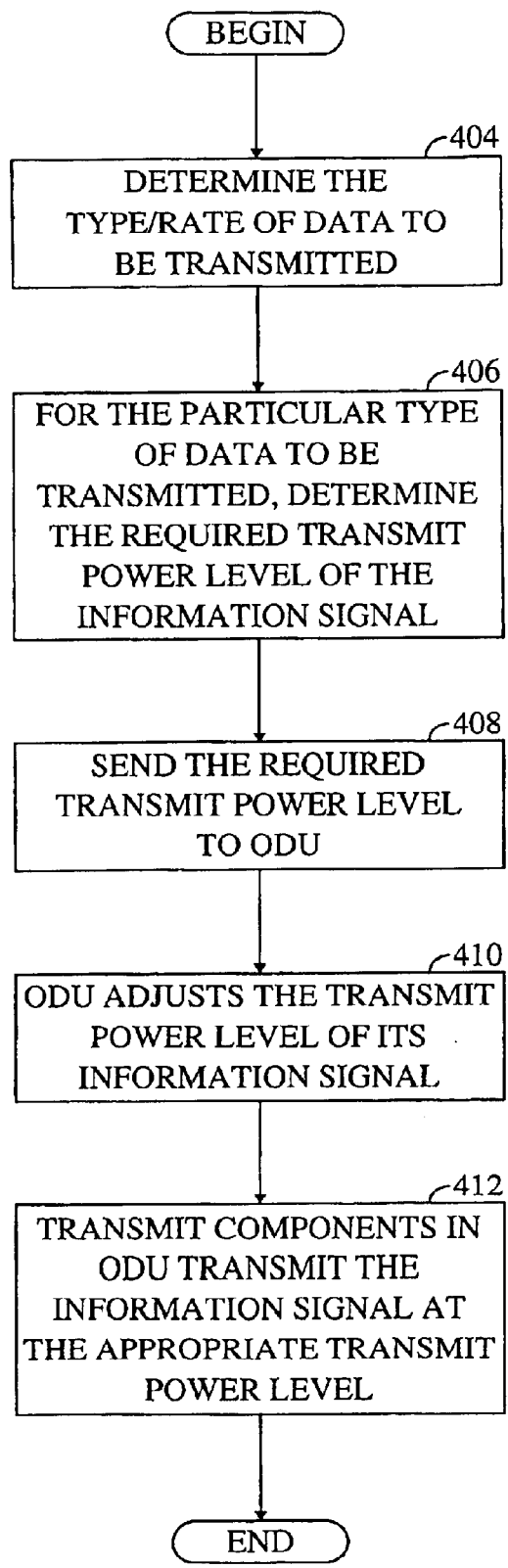
FIG. 4 is a flowchart illustrating the use of a car kit for transferring signals according to a preferred embodiment of the present invention.

FIG. 4 is a flowchart illustrating the operation of a car kit 104 during a call or communication link. First, a call is established, then the parties proceed to communicate information, and finally the call is terminated. Information signals containing the information needed for each of these phases of a call pass to and from car kit 104. The transmit power level of the information signals is controlled by hand held device 110 and communicated to ODU 112.

The flowchart in FIG. 4 begins with step 404. In step 404, hand held logic unit 302 determines the type of data or data rate for data that is to be transmitted. The different types of data may include data transmitted via personal computers, data representing a digitized voice, facsimile data, etc. In step 406, logic unit 302 determines a required transmit power level for the particular data rate of the data. This is important because different data rates require different power for transmission of that data, and data rate changes depending on the type of data being sent or signal processing being used to generate the data. In step 408, logic unit 302 transmits the control voltage to ODU 112 via transmit components 304 and cable 111. In this way, hand held device 110 informs ODU 112 (via the control voltage) of the transmit power level it needs to produce for the information signal, to achieve an output power level desired by the wireless device.

A call or communication link, meaning information signals, including access requests for the gateway, may be sent over a period of time and result in repeated adjustments of signal power. An information signal may include various types of information such as: information to establish the call to the recipient, information to be sent from hand held device 110 to the recipient, such as a digitized version of someone's voice, and information to indicate that one of the parties has terminated the call. Transmit components 304 send the information signal to ODU 112 where they are received by transmit components 326 within ODU 112. The circuitry within transmit components 326 needed to transmit the signal from vehicle 106 to satellite 116 resides in ODU 112.

In step 410, ODU 112 adjusts the transmit power level of the information signal. Finally, in step 412, transmit components 326 in ODU 112 transmit the signal to satellite 116 via ODU antenna 114. ODU antenna 114 is typically physically connected to the top of ODU 112, although not required, and transmits signals from vehicle 106 to satellite 116. When satellite 116 receives the signal from ODU antenna 114, satellite 116 sends the signal to antenna 118 within wireless communications network 128. The signal is received by antenna 118 and is transferred to a recipient via gateway 120. The process for adjusting transmit power level in ODU 112 is described in further detail with respect to FIG. 5.

Figure 5:
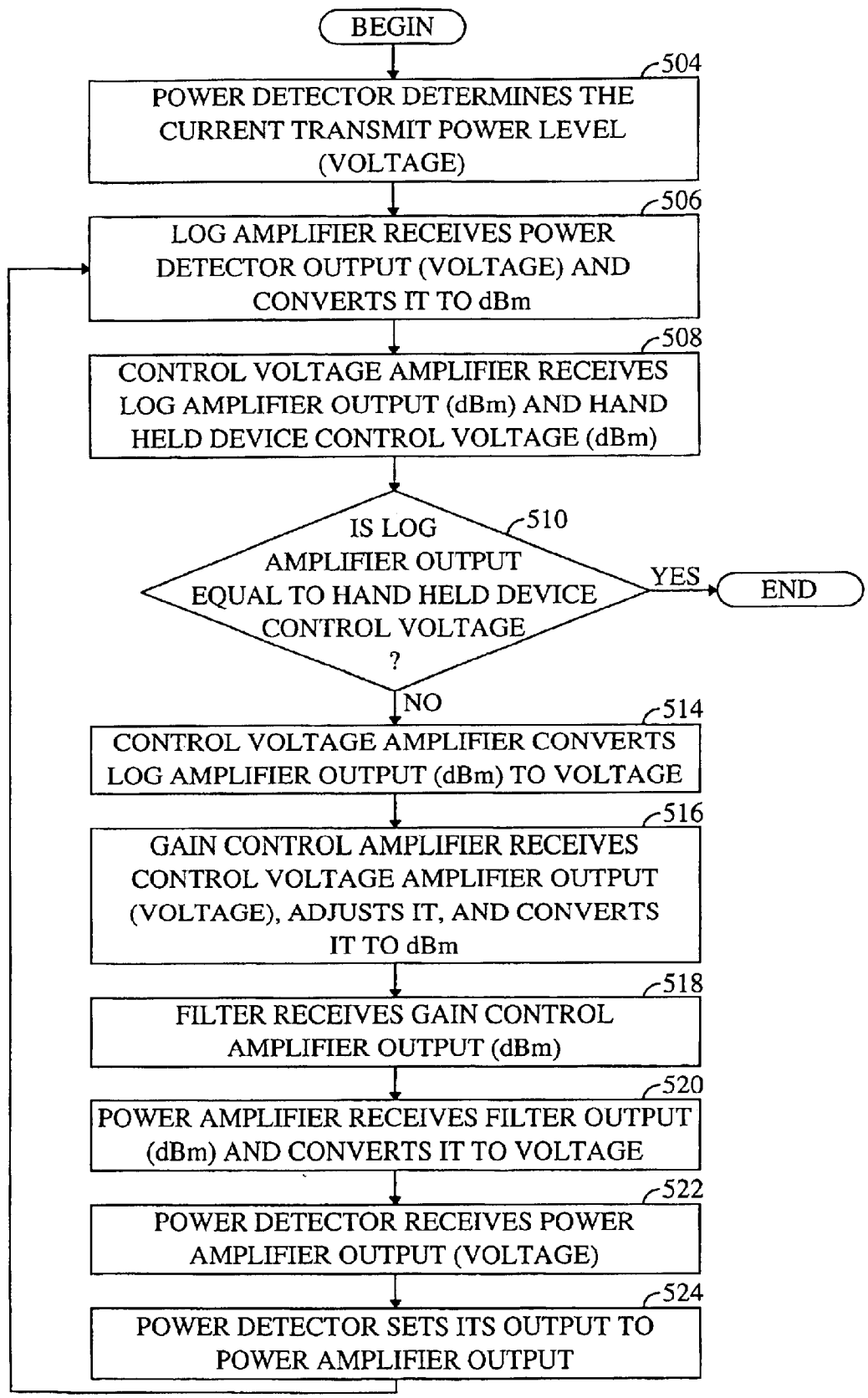
FIG. 5 is a flowchart illustrating the operation of a closed loop circuit of an ODU to adjust transmission power levels according to a preferred embodiment of the present invention.

FIG. 5 is a detailed flowchart of step 410, illustrating the operation of the closed loop circuit of ODU 112 to adjust its transmit power level. The flowchart in FIG. 5 begins with step 504. In step 504, power detector 316 determines the current transmit power level (in voltage) of ODU 112 in a manner well known to one skilled in the relevant art. The output of power detector 316 is logarithmic. In step 506, log amplifier 314 receives power detector 316 output and converts it to dBm. Log amplifier 314 undoes or linearizes the logarithmic function of power detector 316, as described above. In step 508, control voltage amplifier 312 receives both log amplifier 314 output (dBm) and hand held device 110 control voltage (dBm).

The control voltage of hand held device 110 indicates to ODU 112 the transmit power level it needs to produce. Hand held device 110 requires ODU 112 to produce different transmit power levels based on different known factors such as the data rate. Data rate changes depending on the type of data being sent. For example, different types of data requiring different data rates include data transmitted via personal computers, data representing a digitized voice, facsimile data, etc. In fact, even the same types of data may require different data rates. For example, voice coding using variable data rates causes the data rate to change over time. A change from 4800 bps to 9600 bps results in an increase in power to transmit 9600 bps over 4800 bps. Therefore, hand held device 110 is constantly or periodically, on a predetermined basis, changing its control voltage and thus the transmit power level ODU 112 must produce. This allows hand held device 110 to change its transmit power level and provide a desired power level in the signal output to gateway 120. It also allows a level of consistency in control of output power levels across different hand held units or models that can be connected to car kit 104.

In step 510, log amplifier 314 output is compared to the control voltage. If, in step 510, it is determined that log amplifier 314 output is equal to the control voltage, the processing for adjusting to power of FIG. 5 ends. If it has been determined in step 510 that log amplifier 314 output is not equal to the control voltage, the processing flow proceeds to step 514.

When the processing flow of FIG. 5 ends, ODU 112 has produced the transmit output power required by hand held device 110 and is ready to transmit the information signal, or is ready to maintain a desired power level for a information being transmitted for an existing communication link. Alternatively, in step 514, ODU 112 has not yet produced the transmit power level required by hand held device 110. Here, control voltage amplifier 312 converts log amplifier 314 output (dBm) to voltage. In step 516, gain control amplifier 324 receives control voltage amplifier 312 output (voltage), adjusts it based on the control voltage, and converts it to dBm. In step 518, filter 322 receives gain control amplifier 324 output (dBm).

In step 520, power amplifier 320 receives the output of filter 322 (dBm) and converts it to a voltage level. In step 522, power detector 316 receives the voltage output by power amplifier 320. In step 524, power detector 316 sets its output to power amplifier 320 output and processing flow returns to step 506. The processing illustrated by the flowchart in FIG. 5 continues until ODU 112 produces the transmit power level required or desired by hand held device 110. The process for adjusting transmit power level in gain control amplifier 324 is described in further detail with respect to FIG. 6.

Figure 6:
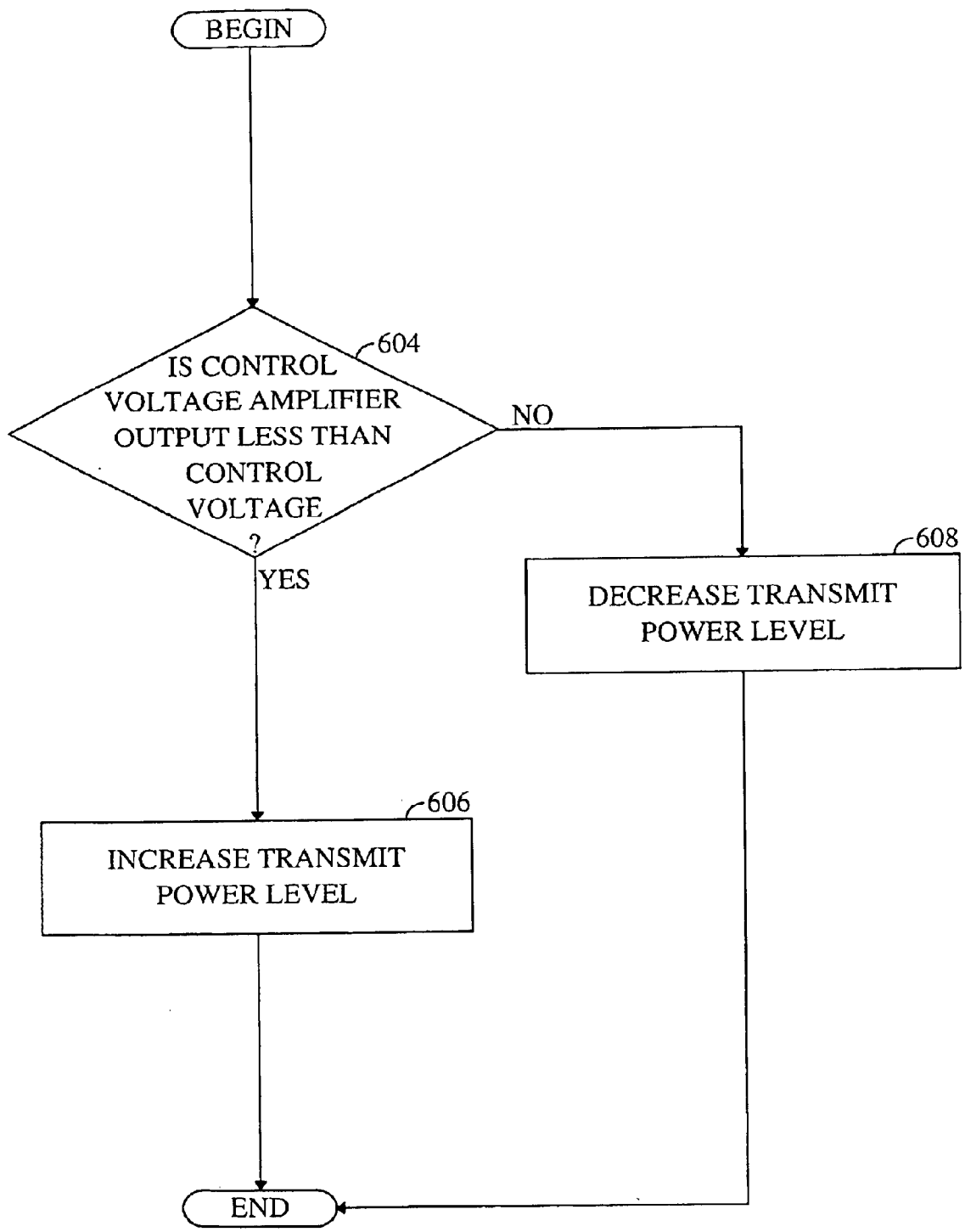
FIG. 6 is a flowchart illustrating the operation of a gain control amplifier to adjust the ODU transmit power level according to a preferred embodiment of the present invention.

FIG. 6 is a detailed flowchart of step 516, illustrating the operation of gain control amplifier 324 to adjust the transmit power level of ODU 112 by adjusting its own output. The flowchart in FIG. 6 begins with step 604 where the output of control voltage amplifier 312 is compared to the control voltage. Here, the output of control voltage amplifier 312 represents the current transmit power level of ODU 112. If, in step 604, it is determined that the output level of control voltage amplifier 312 is less than the control voltage, the processing flow proceeds to step 606. If it has been determined in step 604 that the output of control voltage amplifier 312 is greater than the control voltage, processing flow proceeds to step 608.

In step 606, ODU 112 transmit power level is increased by increasing the output of gain control amplifier 324, and processing ends. Alternatively, in step 608, ODU 112 transmit power level is decreased by decreasing the output of gain control amplifier 324, and processing ends.

While various embodiments of the present invention have been described above, it should be understood that they have been presented by way of example only, and not limitation. Thus, the breadth and scope of the present invention should not be limited by the above-described exemplary embodiments, but should be defined only in accordance with the following claims and their equivalents.

We claim:

1. An apparatus for controlling a transmit power level of an information signal in an external antenna unit coupled to a hand held device comprising:

a logic unit in the hand held device configured to produce a control voltage indicating a transmit power level desired by the hand held device; and a closed loop circuit in the antenna unit configured to receive the control voltage from said logic unit and to adjust the transmit power level of the information signal based on the control voltage, said closed loop circuit further comprising:

a power detector for detecting the transmit power level of the external antenna unit;

a log amplifier coupled to said power detector, wherein said log amplifier converts the output of said power detector to a digital format to produce a log amplifier output;

a control voltage amplifier coupled to said log amplifier, wherein said control voltage amplifier determines whether said log amplifier output is equal to the control voltage, wherein said control voltage amplifier converts said log amplifier output to a voltage format to produce a control voltage amplifier output, and wherein said transmit power level is set equal to said log amplifier output if said log amplifier output is equal to said control voltage;

a gain control amplifier coupled to said control voltage amplifier, wherein said gain control amplifier adjusts said control voltage amplifier output if said control voltage amplifier determines that said log amplifier output is not equal to the control voltage, and wherein said gain control amplifier converts said adjusted control voltage amplifier output to a digital format to produce a gain control amplifier output;

a filter coupled to said gain control amplifier, to filter said gain control amplifier output; and a power amplifier coupled to said filter, wherein said power amplifier converts the output of said filter to a voltage format to produce a power amplifier output, wherein said power detector is coupled to said power amplifier, and wherein said power detector output is set equal to said power detector input.

2. An apparatus for controlling a transmit power level of an information signal in an external antenna unit coupled to a hand held device comprising:

a logic unit in the hand held device configured to produce a control voltage indicating a transmit power level desired by the hand held device; and a closed loop circuit in the antenna unit configured to receive the control voltage from said logic unit and to adjust the transmit power level of the information signal based on the control voltage, said closed loop circuit further comprising:

a power detector for detecting the transmit power level of the antenna unit, wherein said power detector has a power detector input and a power detector output;

a ROM based look-up table coupled to said power detector, wherein said ROM look-up table replaces said power detector output with a digital format to produce a ROM look-up table output;

a control voltage amplifier coupled to said ROM look-up table, wherein said control voltage amplifier determines whether said ROM look-up table output is equal to the control voltage, wherein said control voltage amplifier converts said ROM look-up table output to a voltage format to produce a control voltage amplifier output, and wherein said transmit power level is set equal to said ROM look-up table output if said ROM look-up table output is equal to said control voltage;

a gain control amplifier coupled to said control voltage amplifier, wherein said gain control amplifier adjusts said control voltage amplifier output if said control voltage amplifier determines that said ROM look-up table output is not equal to the control voltage, and wherein said gain control amplifier converts said adjusted control voltage amplifier output to a digital format to produce a gain control amplifier output;

a filter coupled to said gain control amplifier, to filter said gain control amplifier output; and a power amplifier coupled to said filter, wherein said power amplifier converts the output of said filter to a voltage format to produce a power amplifier output, wherein said power detector is coupled to said power amplifier, and wherein said power detector output is set equal to said power detector input.

3. A closed loop circuit for adjusting a transmit power level of an information signal based on a control voltage, wherein the control voltage is sent from a hand held device to an antenna unit, comprising:

a power detector for detecting the transmit power level of the antenna unit;

a log amplifier coupled to said power detector, wherein said log amplifier converts the output of said power detector to a digital format to produce a log amplifier output;

a control voltage amplifier coupled to said log amplifier, wherein said control voltage amplifier determines whether said log amplifier output is equal to the control voltage, and wherein said control voltage amplifier converts said log amplifier output to a voltage format to produce a control voltage amplifier output;

a gain control amplifier coupled to said control voltage amplifier, wherein said gain control amplifier adjusts said control voltage amplifier output if said control voltage amplifier determines that said log amplifier output is not equal to the control voltage, and wherein said gain control amplifier converts said adjusted control voltage amplifier output to a digital format to produce a gain control amplifier output;

a filter coupled to said gain control amplifier to filter said gain control amplifier output; and a power amplifier coupled to said filter, wherein said power amplifier converts the output of said filter to a voltage format to produce a power amplifier output, wherein said power detector is coupled to said power amplifier, and wherein said power detector output is set equal to said power detector input.

4. A closed loop circuit for adjusting a transmit power level of an information signal based on a control voltage, wherein the control voltage is sent from a hand held device to an antenna unit, comprising:

a power detector for detecting the transmit power level of the antenna unit;

a look-up table coupled to said power detector, wherein said look-up table replaces the output of said power detector with a digital format to produce a look-up table output;

a control voltage amplifier coupled to said look-up table, wherein said control voltage amplifier determines whether said look-up table output is equal to the control voltage, and wherein said control voltage amplifier converts said look-up table output to a voltage format to produce a control voltage amplifier output;

a gain control amplifier coupled to said control voltage amplifier, wherein said gain control amplifier adjusts said control voltage amplifier output if said control voltage amplifier determines that said look-up table output is not equal to the control voltage, and wherein said gain control amplifier converts said adjusted control voltage amplifier output to a digital format to produce a gain control amplifier output;

a filter coupled to said gain control amplifier to filter said gain control amplifier output; and a power amplifier coupled to said filter, wherein said power amplifier converts the output of said filter to a voltage format to produce a power amplifier output, wherein said power detector is coupled to said power amplifier, and wherein said power detector output is set equal to said power detector input.

5. A method for adjusting a transmit power level of an information signal based on a control voltage, wherein the control voltage is sent from a hand held device to an antenna unit, comprising the steps of:

detecting, by a power detector, the transmit power level of the antenna unit, wherein said power detector has a power detector input and a power detector output;

converting, by a log amplifier, said power detector output to a digital format to produce a log amplifier output;

determining, by a control voltage amplifier, whether said log amplifier output is equal to the control voltage;

converting, by said control voltage amplifier, said log amplifier output to a voltage format to produce a control voltage amplifier output if the outcome of said determining step is negative;

adjusting, by a gain control amplifier, said control voltage amplifier output if the outcome of said determining step is negative;

converting, by said gain control amplifier, said adjusted control voltage amplifier output to a digital format to produce a gain control amplifier output if the outcome of said determining step is negative;

filtering, by a filter, said gain control amplifier output to produce a filter output if the outcome of said determining step is negative;

converting, by a power amplifier, said filter output to a voltage format to produce a power amplifier output if the outcome of said determining step is negative; and setting said power amplifier output equal to said power detector input if the outcome of said determining step is negative.

6. The method of claim 5, wherein said adjusting further comprises the steps of:

increasing the transmit power level if said log amplifier output level is less than the control voltage; and decreasing the transmit power level if said log amplifier output power level is greater than the control voltage.

7. A method for adjusting a transmit power level of an information signal based on a control voltage, wherein the control voltage is sent from a hand held device to an antenna unit, comprising the steps of:

detecting, by a power detector, the transmit power level of the antenna unit, wherein said power detector has a power detector input and a power detector output;

converting, by a ROM look-up table, said power detector output to a digital format to produce a ROM look-up table output;

determining, by a control voltage amplifier, whether said ROM look-up table output is equal to the control voltage;

converting, by said control voltage amplifier, said ROM look-up table output to a voltage format to produce a control voltage amplifier output if the outcome of said determining step is negative;

adjusting, by a gain control amplifier, said control voltage amplifier output if the outcome of said determining step is negative;

converting, by said gain control amplifier, said adjusted control voltage amplifier output to a digital format to produce a gain control amplifier output if the outcome of said determining step is negative;

filtering, by a filter, said gain control amplifier output to produce a filter output if the outcome of said determining step is negative;

converting, by a power amplifier, said filter output to a voltage format to produce a power amplifier output if the outcome of said determining step is negative; and setting said power amplifier output equal to said power detector input if the outcome of said determining step is negative.

8. The method of claim 7, wherein said adjusting further comprises the steps of:

increasing the transmit power level if said ROM look-up table output level is less than the control voltage; and decreasing the transmit power level if said ROM look-up table output level is greater than the control voltage.

* * * * *